United States Patent
Alder (10) Patent No.: US 12,427,907 B2
(45) Date of Patent: Sep. 30, 2025

(54) LEVELING MOUNT FOR A VEHICLE MOUNTED TENT

(71) Applicant: Brian Christopher Alder, Sycamore, IL (US)

(72) Inventor: Brian Christopher Alder, Sycamore, IL (US)

( * ) Notice: Subject to any disclaimer, the term of this patent is extended or adjusted under 35 U.S.C. 154(b) by 54 days.

(21) Appl. No.: 18/529,192

(22) Filed: Dec. 5, 2023

(65) Prior Publication Data

US 2025/0178512 A1     Jun. 5, 2025

(51) Int. Cl.
    *B60P 3/34*      (2006.01)
    *E04H 15/32*      (2006.01)
    *E04H 15/06*      (2006.01)

(52) U.S. Cl.
    CPC ............ *B60P 3/34* (2013.01); *E04H 15/32* (2013.01); *E04H 15/06* (2013.01)

(58) Field of Classification Search
    CPC ............. B60P 3/34; E04H 15/32; E04H 15/06
    USPC .................. 248/277.1, 352; 254/126, 122
    See application file for complete search history.

(56) References Cited

U.S. PATENT DOCUMENTS

| | | | | |
|---|---|---|---|---|
| 526,450 | A * | 9/1894 | Leach | A47G 25/746 211/105 |
| 2,927,702 | A * | 3/1960 | Deusen, Jr. | A47B 3/02 108/99 |
| 3,266,772 | A * | 8/1966 | Francis | A47G 27/0493 294/8.6 |
| 3,329,104 | A | 7/1967 | Gittings | |
| 5,029,814 | A * | 7/1991 | Liegel | B66F 3/22 254/133 R |
| 5,975,497 | A * | 11/1999 | Few | B66F 3/12 254/126 |
| 8,770,549 | B2 | 7/2014 | Deuring et al. | |
| 10,077,574 | B1 | 9/2018 | Currid | |
| 10,501,295 | B2 | 12/2019 | Eashan | |
| 11,299,905 | B2 | 4/2022 | Brensinger | |
| 11,433,799 | B2 | 9/2022 | Harris et al. | |

(Continued)

FOREIGN PATENT DOCUMENTS

| | | |
|---|---|---|
| CN | 116607839 A | 8/2023 |
| DE | 4334331 A1 | 10/1993 |

(Continued)

OTHER PUBLICATIONS

International Search Report and Written Opinion for PCT Application No. PCT/US2024/055854.

*Primary Examiner* — Kimberly T Wood
(74) *Attorney, Agent, or Firm* — Erickson Law Group, PC (57) ABSTRACT

A leveling mount for a vehicle mounted tent is disclosed. In some embodiments, the mount comprises a base bracket, an upper bracket, first and second upper legs, first and second lower legs, and first and second arms. The first and second upper legs are pivotally connected to the upper bracket. The first and second lower legs are pivotally connected to the base bracket. The first upper and lower legs are pivotally connected to a first joint. The second upper and lower legs are pivotally connected at a second joint. The first arm has a plurality of slots corresponding to a plurality of elevations of the upper bracket. The first and second arms connect to the first joint and are releasably connected to the second joint. The second arm is moveable relative to the first arm between a secured position and a released position.

20 Claims, 8 Drawing Sheets

(56) References Cited

U.S. PATENT DOCUMENTS

| | | |
|---|---|---|
| 11,578,499 B2 | 2/2023 | Currid |
| 11,584,627 B2 | 2/2023 | Peterson et al. |
| 12,214,712 B1* | 2/2025 | Andrews ................. E04H 15/06 |
| 2003/0066334 A1 | 4/2003 | McClellan |
| 2004/0200258 A1 | 10/2004 | Hess |
| 2005/0104384 A1* | 5/2005 | Kondo ............... B60N 2/01583 |
| | | 292/240 |
| 2017/0349080 A1 | 12/2017 | Sautter et al. |
| 2018/0055234 A1 | 3/2018 | Strater |
| 2018/0172204 A1 | 6/2018 | Grappe |
| 2021/0062842 A1 | 3/2021 | Chen |
| 2022/0081269 A1 | 3/2022 | Gao |

FOREIGN PATENT DOCUMENTS

| | | |
|---|---|---|
| EP | 3988395 B1 | 10/2020 |
| WO | 2023044527 A1 | 3/2023 |

* cited by examiner

LEVELING MOUNT FOR A VEHICLE MOUNTED TENT

FIELD

This application relates in general to a leveling mount for a vehicle mounted tent.

BACKGROUND

Vehicles are used to transport people to camp sites and other locations. Sleeping on the ground, such as in a tent or otherwise, has the disadvantages of being subject to the varying ground conditions, including unevenness and wetness, among others. Further, there may be a lack of an adequate place or clearing to deploy a tent. Further deploying a tent on the ground allows more ready access by animals. Previously, where a level sleeping, sitting, or work surface is desired, deploying a tent on top of a vehicle may be disadvantageous where the vehicle is parked on an unlevel surface causing the deployed tent thereon to be unlevel.

SUMMARY

A leveling mount for a vehicle mounted tent is disclosed. In some embodiments, the mount comprises a base bracket, an upper bracket, a first upper leg, a second upper leg, a first lower leg, a second lower leg, a first arm, and a second arm. The first upper leg and the second upper leg are pivotally connected to the upper bracket. The first lower leg and the second lower leg are pivotally connected to the base bracket. The first upper leg is pivotally connected to the first lower leg at a first joint. The second upper leg is pivotally connected to the second lower leg at a second joint. The first arm has a plurality of slots corresponding to a plurality of elevations of the upper bracket. The first arm connected to the first joint, the first arm releasably connected the second joint at a selected slot of the plurality of slots corresponding to a desired elevation of the plurality of elevations. The second arm is connected to the first joint and releasably connected to the second joint. The second arm is moveable relative to the first arm between a secured position where the first arm and the second arm are secured to the second joint and a released position where the first arm and the second arm are able to disengage from the second joint.

In some embodiments, the second arm comprises a plurality of teeth. The second arm is moveable relative to the first arm between the secured position where the plurality of teeth intersect the plurality of slots and a released position where the plurality of teeth are withdrawn from the plurality of slots.

A method of leveling a tent above a vehicle is disclosed. A height of a leveling mount for supporting the tent above the vehicle is extended or retracted. A first arm and a second arm of the leveling mount are lowered onto a pin in a joint where the pin is received into a slot of a first plurality of slots of the first arm corresponding to a desired height of the leveling mount. The second arm is moved relative to the first arm to a secured position where a tooth of the second arm blocks the pin from withdraw from the slot in at least one direction.

Numerous other advantages and features of the present invention will become readily apparent from the following detailed description of the invention and the embodiments thereof, from the claims and from the accompanying drawings.

DETAILED DESCRIPTION

The following description is presented to enable any person skilled in the art to make and use the invention. For the purposes of explanation, specific nomenclature is set forth to provide a plural understanding of the invention. While this invention is susceptible of embodiment in many different forms, this description describes and the drawings show specific embodiments of the invention with the understanding that the present disclosure is to be considered as an exemplification of the principles of the invention and is not intended to limit the invention to the specific embodiments illustrated.

Figure 1:
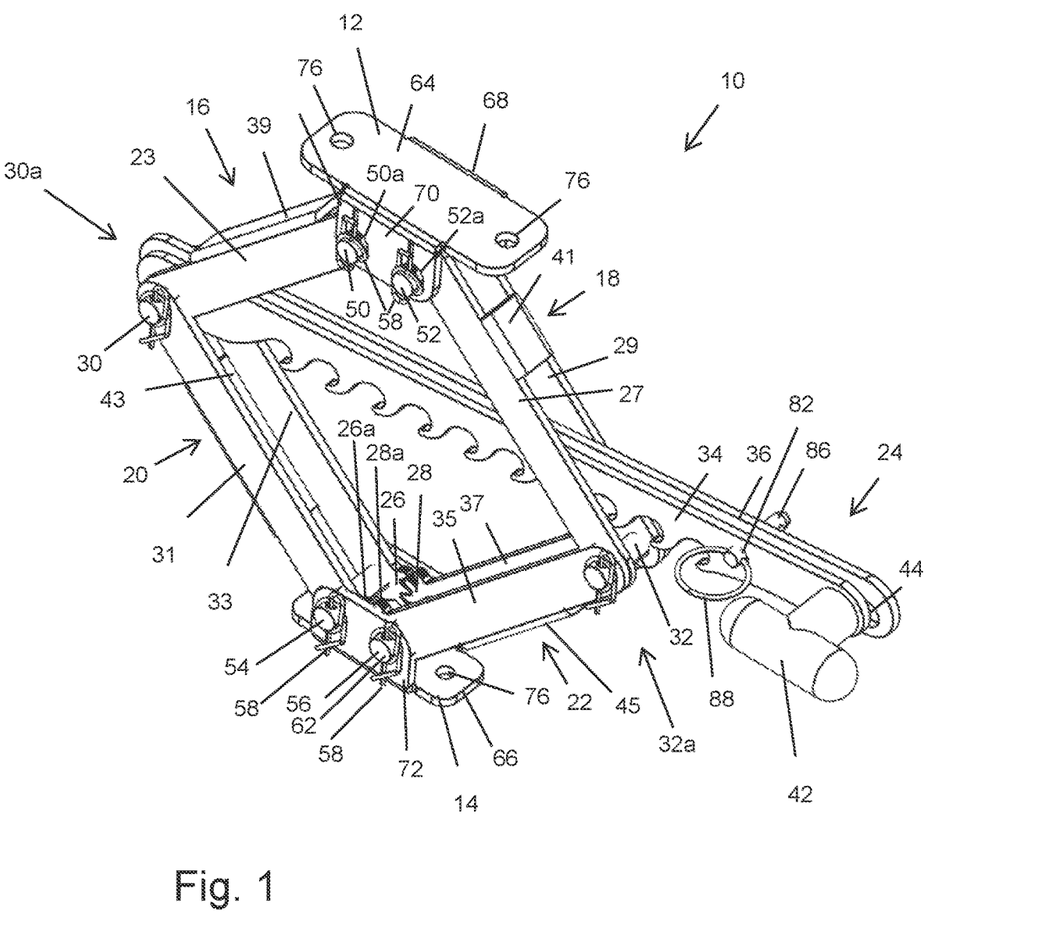
FIG. 1 is a perspective view of an embodiment of a leveling mount of the invention.

FIG. 1 shows an embodiment of a leveling mount 10 for deploying a tent on top of a vehicle. The mount comprises an upper bracket 12 and a base bracket 14, upper legs 16, 18, lower legs 20, 22, a first arm 34, and a second arm 36. The upper bracket and base bracket are connected by the legs 16, 18, 20, 22.

Figure 2:
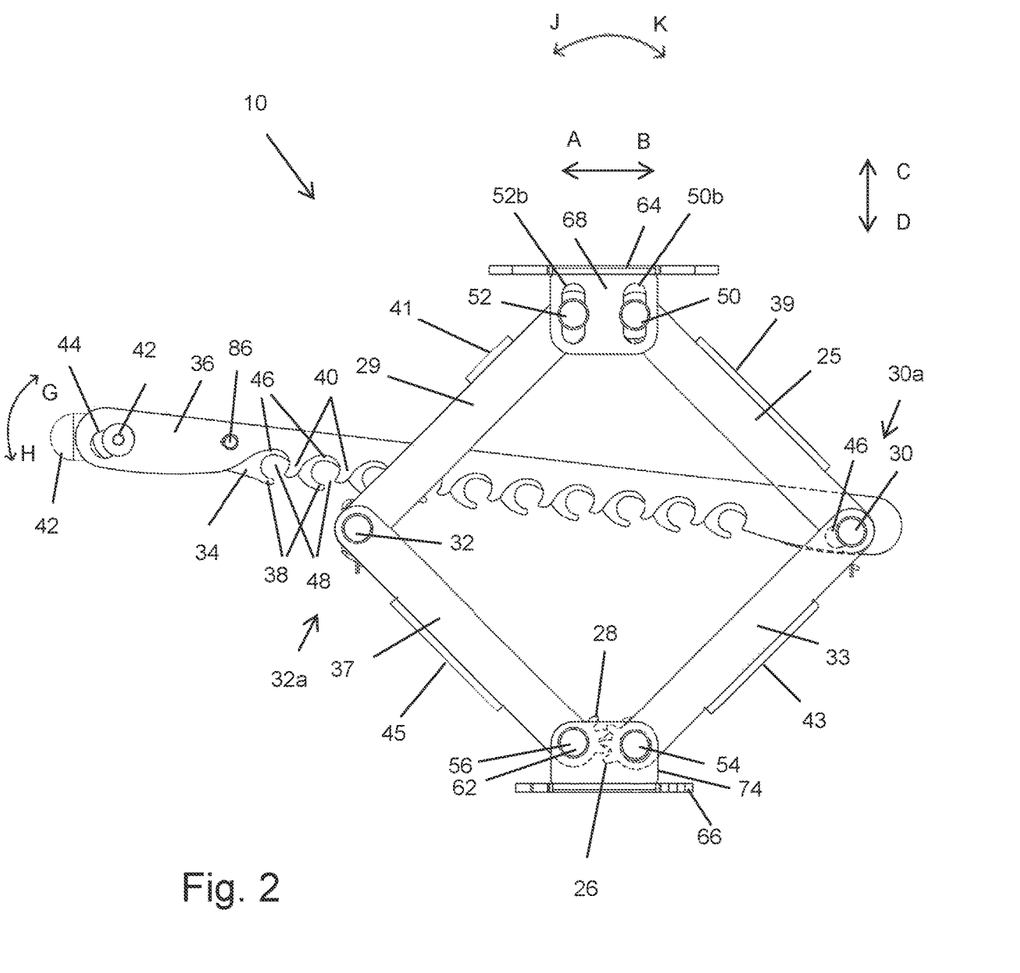
FIG. 2 is a side view of the leveling mount of FIG. 1.

Each leg 16, 18, 20, 22 comprises a pair of spaced apart segments 23, 25, 27, 29, 31, 33, 35, 37. Each of the spaced apart segments of a given leg 16, 18, 20, 22 may be parallel to each other. The pairs of segments are joined by connecting segments 39, 41, 43, 45 as shown in FIGS. 1 and 2. The connecting segments are transverse to the respective pair of segments joined.

Each of the segments of the lower legs 20, 22 comprise gears 26, 28, 26a, 28a at the bottom end of each segment. The gears 26a, 28a are the same as respective gears 26, 28. The gears mesh as shown in FIGS. 1 and 2. The gears 26a, 28a of segments 31, 35 mesh in the same manner as gears 26, 28, as is shown in FIG. 2, for segments 33, 37. The meshed gears provide stability, including lateral stability to the mount.

Figure 3:
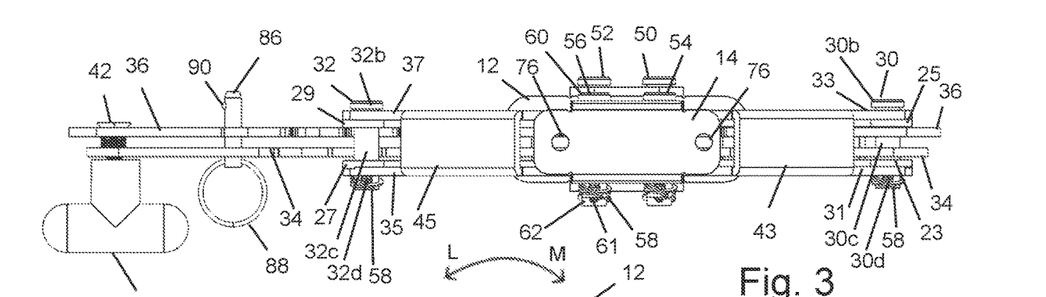
FIG. 3 is a bottom view of the leveling mount of FIG. 1.

First upper leg 16 and first lower leg 20 are pivotally joined at a first joint 30a at a pin 30 in the first joint. Legs 16, 20 pivot about pin 30 and the pin 30 extends through the legs 16, 20. Second upper leg 18 and second lower leg 22 are pivotally joined at a second joint 32a at a pin 32 in the second joint. Legs 18, 22 pivot about pin 32 and the pin 32 extends through the legs 18, 22. Each of the pins comprise a head 30b, 32b and a shaft 30c, 32c. The head has a larger diameter or width than the shaft. The terminal end of the shaft opposite of the head comprises a through aperture 30d, 32d for receiving a removable retainer clip 58. The pins 30, 32 are secured against removal from respective legs by the head on one side and the retainer clip on the other side as shown in FIGS. 1 and 3.

Upper legs 16, 18 are pivotally connected to the upper bracket 12 by a pair of pins 50, 52. The legs 16, 18 are pivotal about the respective pin 50, 52. The lower legs 20, 22 are pivotally connected to the base bracket by pins 54, 56. The legs 20, 22 are pivotal about the respective pin 54, 56. The pins 50, 52, 54, and 56 are the same. Each pin comprises a head 60 and a shaft 62 (labeled for pin 56). The head 60 has a larger diameter or width than the shaft. The shaft comprises a through aperture 61 at a terminal end of the shaft opposite the head for receiving the removable retainer clip 58. The pins are secured against removal from the respective upper and base brackets by the head of the pin on one side and by the retainer clips 58 on the other side of the pin.

Figure 4:
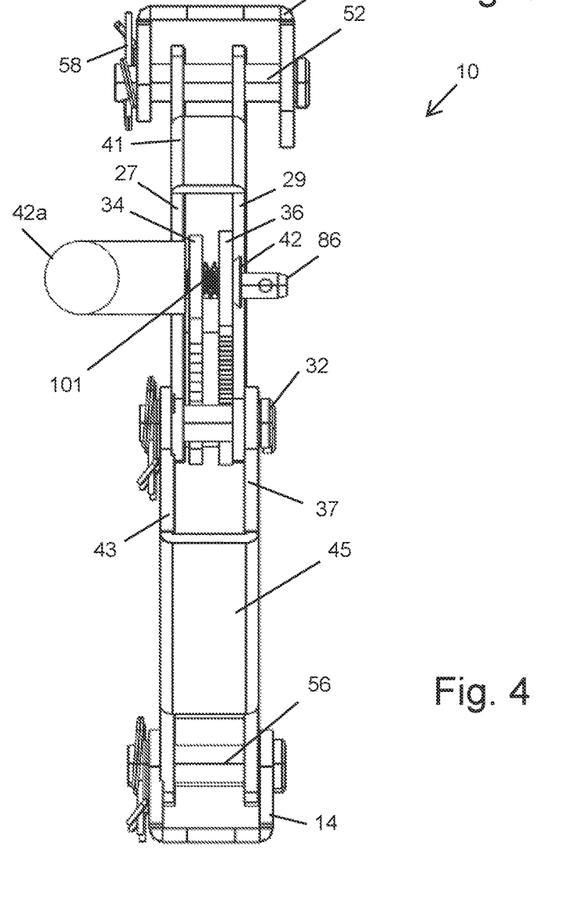
FIG. 4 is an end view of the leveling mount of FIG. 1.
Figure 9:
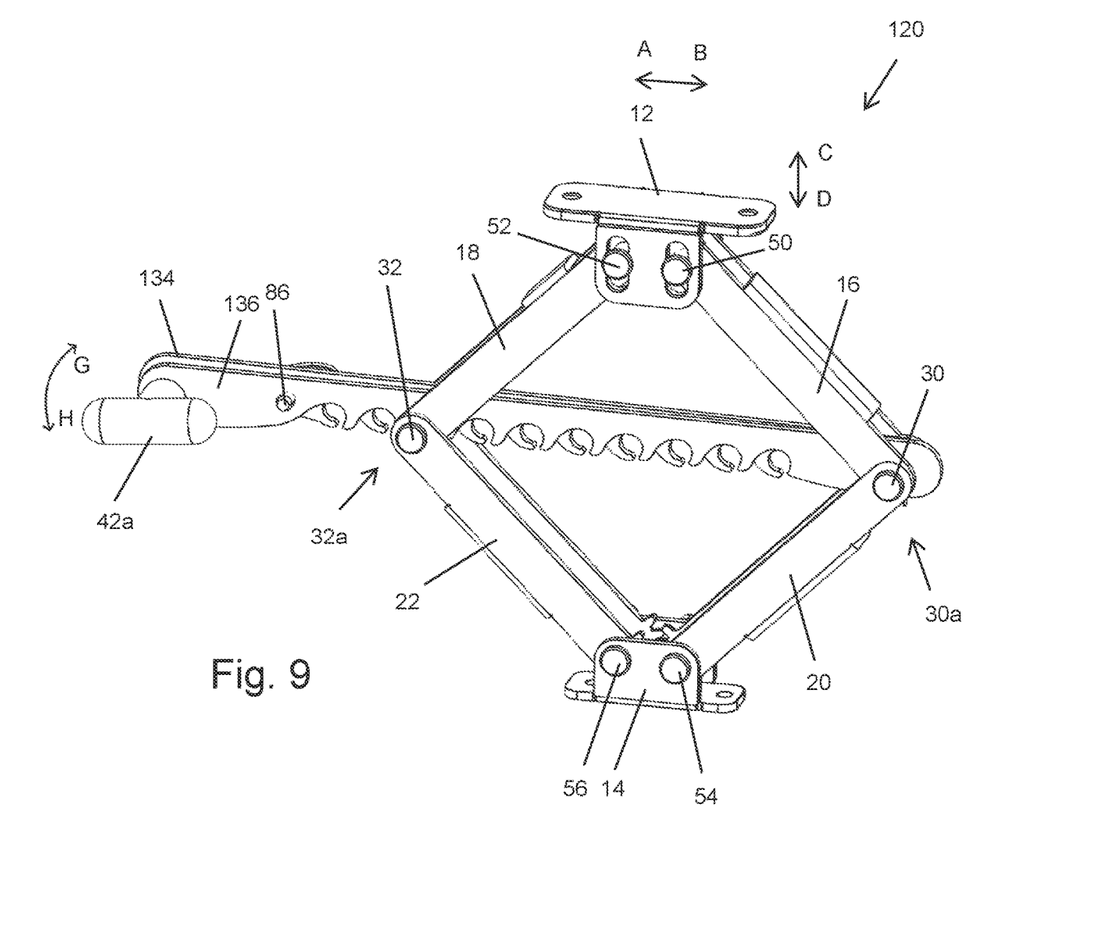
FIG. 9 is a perspective view of a second embodiment leveling mount of the invention.

Each of the upper bracket 12 and the base bracket 14 comprise a base plate 64, 66 and opposite spaced apart side plates 68, 70, 72, 74. The side plates may extend perpendicularly from the base plate. Each base plate comprises one or more bracket apertures 76 which may be located at opposite ends of the base plate for receiving fasteners for mounting the base bracket 14 and the mount 10 to a vehicle or a rack of a vehicle, such as shown in FIG. 9. The side plates 68, 70, 72, 74 comprise a plurality of apertures for receiving the pins 50, 52, 54, 56. As shown in FIGS. 3 and 4, base bracket 14 may be a different size, such as smaller, than the upper bracket 12, including in a width between terminal ends (in the direction of the apertures 76) of the base plate 66 and a depth between side plates 72, 74 of the base bracket 14.

The pins 50, 52, 54, 56 pivotally join the terminal ends of the legs by extending through apertures in the side plates 68, 70, 72, 74 and through apertures in the terminal ends of each of the segments 23, 25, 27, 29, 31, 33, 35, 35.

Each of the apertures 50a, 50b, 52a, 52b receiving pins 50, 52 in the side plates 68, 70 may optionally be vertically elongated as shown in FIGS. 1 and 2 for plate 68. The elongated apertures allow the bracket 12 and plate 64 to rock longitudinally in the directions J and K of FIG. 2 and to rock laterally in the directions L and M of FIG. 4. This allows the bracket to conform to the angle of the bottom of the platform 105 of the tent 107. The apertures 50a, 52a, may be shorter than apertures 50b, 52b to provide a limit on the vertical range of motion in direction C and D. The pins are secured by the head on the outside of plates 70, 74 and the retainer clips on the opposite side of plates 70, 72. The head of the pins and the retainer clips are larger than the apertures in the side plates 68, 70, 72, 74.

Arms 34, 36 traverse the legs 16, 18, 20, 22. The arms are located between opposite segments 23, 25, 27, 29, 31, 33, 35, 37 of the legs 16, 18, 20, 20, as shown in FIGS. 1, 3, and 4. Therefore, the arms are located within the legs. The arms are connected in joint 30a to pin 30 and releasably connected in joint 32a to pin 32. The arms are connected via pin 30 to legs 16, 20 and releasably connected via pin 32 to legs 18, 22. The arms 34, 36 comprise teeth 38, 40, the teeth forming slots 46, 48 interspersed therebetween, such as shown in FIGS. 5 to 8. While the arms 34, 36 are shown with ten slots 46, 48 each and ten teeth 38, 40 each, the arms may be provided with any number of slots and teeth to provide a desired height adjustment range to the mount 10.

Figures 5, 6:
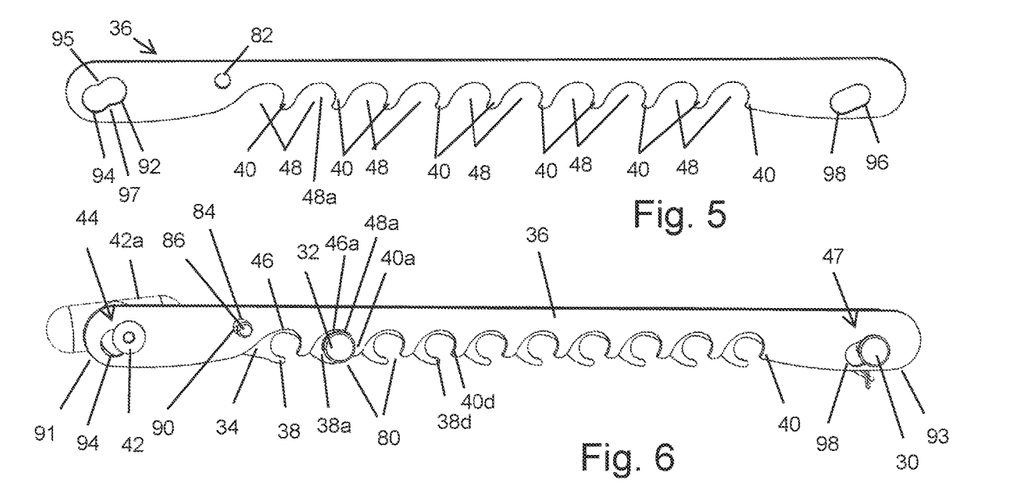
FIG. 5 is a side view of a second arm of the leveling mount of FIG. 1.
FIG. 6 is a side view of a first arm and the second arm of the leveling mount of FIG. 1 in a secured position.
Figure 7:
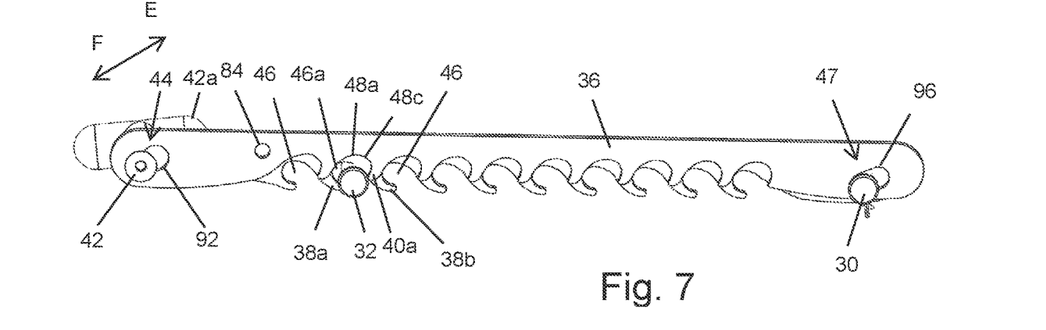
FIG. 7 is a side view of the arms of the leveling mount of FIG. 1 in a released position.

FIG. 6 shows the arms in a secured position about the pin 32 and FIG. 7 shows the arms in a released position. In the secured position, a tooth 38a of the first arm 34 is engaged with a first portion of the pin 32 and an opposite tooth 40a of the second arm 36 is engaged with a second portion of the pin 32 such that the pin 32 is secured in the slot 46a of the first arm and the slot 48a of the second arm between the teeth 38a, 40a. When in the secured position, the plurality of teeth 40 of arm 36 intersect the plurality of slots 46 of arm 34 to prevent the arms 34, 36 from disconnecting from the pin 32 in the direction G and to prevent the pin 32 from exiting the slot 46 in the direction H of FIG. 2. Tooth 38a is the same as teeth 38, tooth 40a is the same as teeth 40, slot 46a is the same as slots 46, slot 48a is the same as slots 48.

When in the secured position there may be a gap 80 between the ends of opposing pairs of teeth 38, 40, however a gap is not required. Therefore, the teeth may partially or completely surround the pin when in the secured position. The gap 80 between opposing pairs of teeth 38, 40 will typically be such that the pin cannot escape from the slots 46, 48. The gap 80 is less than a width of the pin 32. The opposing teeth may surround more than fifty percent of the pin 32.

Each of the arms 34, 36 comprise a locking mechanism comprising a locking pin and locking apertures 82, 84. When the arms are in the secured position, the locking apertures of each of the arms are axially aligned and may be concentric. When the locking apertures are aligned, a locking pin 86 can be placed through the aligned apertures to lock the second arm 36 from moving or substantially moving relative to the first arm 34. The locking pin 86 may comprise a pull ring 88 at a first end and a spring biased ball 90 at a opposite second end. The ball is configured to deter the pin from withdrawing from the apertures 82, 84 unless a predefined amount of withdrawing force is applied to the pin. When a predefined amount of withdrawing or inserting force is applied to the pin, that force will overcome the spring bias of the ball and force the ball down into an aperture in the pin 86 and allow the pin to fit through the apertures 82, 84 and the pin to be inserted or withdrawn from the apertures. When the ball is not forced within the aperture in the pin it extends from the shaft so that the shaft at the ball will not fit through the apertures 82, 84. In some embodiments, the locking pin 86 may be similar to pin 30 with a head larger than the shaft and a through aperture at a terminal end of the shaft opposite the head for receiving a removable retainer clip.

When the arms 34, 36 are not locked in the secured position by the locking pin 86, the arm 36 is moveable in the directions E and F from the secured position to the released position and from the released position to the secured position. The arm 36 comprises channels 44, 47 at pins 30, 42 at opposite ends 91, 93 of the arm. The channels 44, 47 comprise a secured portion 92, 96 and a released portion 94, 98. Each of the portions 92, 96, 94, 98 may comprise a partially circular perimeter configured to conform to the respective pin 30, 42.

Figure 8:
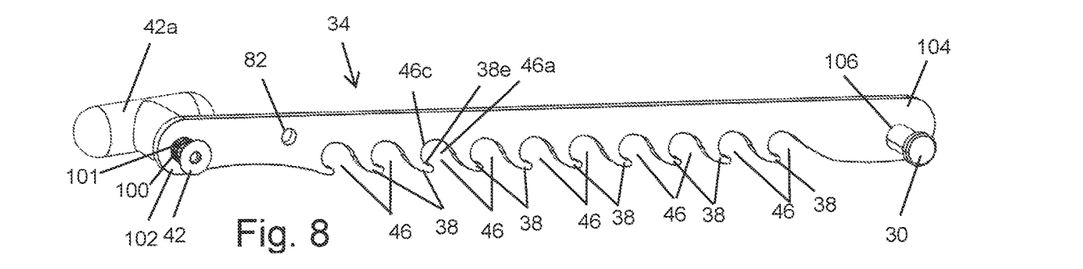
FIG. 8 is a side perspective view of the first arm of FIG. 6.

A handle 42a is attached to one end of pin 42. In some embodiments, pin 42 is a screw. The pin 42 is fixed at an aperture 100 to the first end 102 of the arm 34, such as shown in FIG. 8. Therefore, the handle is fixed to the arm 34.

The head of pin 42 is conical in shape. This shape permits the semi-circular perimeter of portions 92, 94 of channel 44 to create resistance between the secured and released positions of arm 36. A spring 101, shown in FIG. 4, is compressed between arm 36 and 34 on pin 42. The spring bias of the compressed spring presses the perimeter of the channel 44 of arm 36 into the head of pin 42 to create the resistance to moving across the indents 95, 97 between the secured portion 92 and released portion 94 and therefore moving between the secured position and released position of arm 36. Moving the handle moves the arms 34 and 36 in the G and H directions. The pin 30 is received at the second end 104 and a second aperture 106. The second aperture 106 is sized to match or substantially match the size of the pin 30.

To move the arms from the secured position to the released position, the locking pin 86 is removed from the locking apertures 82, 84 if deployed there. Then arm 36 is moved, in the direction E of FIG. 7, to move the channels 44, 47 so that pins 42, 30 are in the released portion 94, 98. The arm 36 may be moved in the direction E by pushing end 91 of arm 36 in the direction E. While the handle is shown fixed to arm 34, in some embodiments, the handle may instead be attached to arm 36, such as shown with arm 136 of FIG. 10.

Moving the arm 36 from the secured position to the released position will increase the size of the gap 80 between opposing pairs of teeth 38, 40, such as opposing pair of teeth 38a, 40a, of the respective arms 34, 36. Increasing the size of the gap 80 will allow the arms to be disengaged from the joint 32a and the arms to be removed from the pin 32 via the enlarged gap. As shown in FIG. 7, moving arm 36 in the direction E raises and shifts longitudinally arm 36 relative to arm 34. As a result, slots 46 are no longer blocked by teeth 40, for example, the slot 46a between teeth 38a, 38b is no longer blocked by tooth 40a of arm 36. Then the arms 34, 36 can be lifted upward, such as with the handle 42, in the direction G of FIG. 2 about the pivot location at pin 30. The pin 32 will withdraw from the slot 46 as the arms move upward in the direction G.

When the arms 34, 36 are above and clear of pin 32, such as shown in FIG. 2, the height or elevation of the upper bracket 12, and therefore the mount 10, can be adjusted up in the direction C or down in the direction D. The height or elevation of the upper bracket 12, and therefore the mount 10 can be extended up in the direction C by lifting the upper bracket 12 up in the direction C, which will draw the first joint 30a inward in the direction A and the second joint 32a inward in the direction B. In addition or in the alternative, the mount 10 can be adjusted up in the direction C by pushing the first and second joints 30a, 32a toward each other. Therefore, when the upper bracket 12 is moved up, the first and second joints 30a, 32a will move toward each other. Moving the upper bracket 12 up in the direction C will also cause the pin 32 to move along the arms 34, 36 in the direction B closer to end 93, 104 of the arms.

The mount 10 can be retracted down in the direction D by lowering the upper bracket 12 in the direction D, which will move the first joint 30a outward in direction B and the second joint 32a outward in direction A. In addition or in the alternative, the mount 10 can be adjusted down in the direction D by pushing the first and second joints 30a, 32a away from each other. Therefore, when the upper bracket 12 is moved down, the first and second joints 30a, 32a will move away from each other. Moving the upper bracket 12 down in the direction D will also cause the pin 32 to move along the arms 34, 36 in the direction A closer to end 91, 102 of the arms 34, 36.

When the desired height or elevation of the upper bracket 12 is reached, the arms 34, 36 are lowered in the direction H about pin 30 until the pin 32 is received in one of the slots 46, 48 of each arm that corresponds to the desired height or elevation of the upper bracket 12 and mount 10. The handle 42a may be used to lower arms 34, 36 in the direction H about pin 30. When the pin 32 reaches the base 46c of the slot 46, such as shown in FIG. 6 and labeled in FIG. 8, the arm 36 can be moved in the direction F, which will cause the channels 44, 47 to move such that the pins 30, 42 are in the secured portion 92, 96 of the channels 44, 47 and the pin 32 is held at or adjacent the base 48c of the slot 48 of arm 36. Moving arm 36 in the direction F lowers and shifts longitudinally arm 36 relative to arm 34. Arm 36 may be moved in direction F by pressing end 93 of arm 36 is direction F. When the pin 32 is in the base 46c of the slot 46, the tooth 40a will be in contact with or be in close proximity to the side of the pin 32 opposite of tooth 38a. The gap 80 will be reduced to prevent the pin 32 from escaping between opposite teeth 38a, 40a, such as shown in FIG. 6. Then the locking pin 86 can be placed through apertures 82, 84 to hold the arms 34, 36 in the secured position relative to each other.

Therefore, the legs 16, 18, 20, 22 are movable in a scissoring fashion about pins 32, 30 to raise or lower the upper bracket 12 and therefore the height of the mount 10. A user can adjust up or down the elevation of the upper bracket 12 and therefore the height of the mount 10, to the desired height or elevation and then selectively engage the corresponding one of the slots 46, 48 in the arms 34, 36 to the pin 32 to set and secure the upper bracket and mount 10 in the desired elevation or height. Also, the teeth 38, 40 are selectively engageable to the pin to set the desired height or elevation of the upper bracket 12 and therefore the mount 10. Engaging the pin 32 to a slot 46, 48 that is closer to joint 30a and to ends 93, 104 of the arms will cause the upper bracket 12 to be at a higher elevation and the mount 10 to be taller and the joints 32a 30a will be closer together. Conversely, engaging the pin to a slot 46, 48 that is farther from joint 30a and closer to ends 91, 102 of the arms will cause the upper bracket to be at a lower elevation and the mount 10 to be shorter and the joints 32a, 30a will be farther apart. Therefore, the upper bracket 12 and the mount 10 have a plurality of different height positions or elevations above the base bracket 14. The slots 46, 48 correspond to the plurality of different height positions or elevations of the upper bracket 12 above the base bracket 14, and therefore a plurality of heights of the mount 10.

Each of the teeth 38 of arm 34 may comprise a cradle portion 38e, which is formed by a portion of the adjacent tooth 38, which may extend around a portion of the bottom of the pin 32 when the pin is received in the corresponding slot 46. When the arms 34, 36 are in the secured position, the slots 48 of arm 36 overlap the slots 46 of arms 34, such as shown in FIG. 6. Further the terminal ends 38d, 40d of each pair of opposing teeth 38, 40 converge and face each other, such as labeled in FIG. 6. The gap 80 is formed between the terminal ends of each pair of opposing teeth 38, 40.

FIG. 9 shows a second embodiment mount 120 for deploying a tent on top of a vehicle and FIGS. 10 to 15 show the arms 134, 136 for mount 120. The mount 120 is the same as, and operates the same as, mount 10, except that the first arm 134 and second arm 136 are modified and have a modified operation as compared to first arm 34 and second arm 36. Common numerals indicate common elements between mount 10 and mount 120. The mount 120 comprises an upper bracket 12 and a base bracket 14, upper legs 16, 18, lower legs 20, 22, a first arm 134, and a second arm 136. The upper bracket and base bracket are connected by the legs 16, 18, 20, 22.

The first arm 134 is the same as arm 34 except arm 134 has the channel 44 of arm 36 at a first end 102 of arm 134 instead of aperture 100. The second arm is the same as arm 36 except that arm 136 has the aperture 100 of arm 34 instead of channel 44. The handle 42a is fixed to arm 136 at aperture 100 instead of arm 34. For arm 136 the secured and released portions of channel 44 is reversed compared to arm 36. Therefore, for arm 136 the secured portion is 94 and the released portion is 92 for channel 44.

To move the arms 134, 136 from the secured position to the released position, the locking pin 86 is removed from the locking apertures 82, 84 if deployed there. Then arm 136 is moved, in the direction N of FIG. 14, to move the pin 42 from the secured portion 94 to the released portion 92 and to move channel 47 so that pin 30 is in the released portion 98. The arm 136 may be moved in the direction N by pushing end 91 of arm 136 in the direction N and/or by moving the handle 42a in the direction N.

Figures 11, 12:
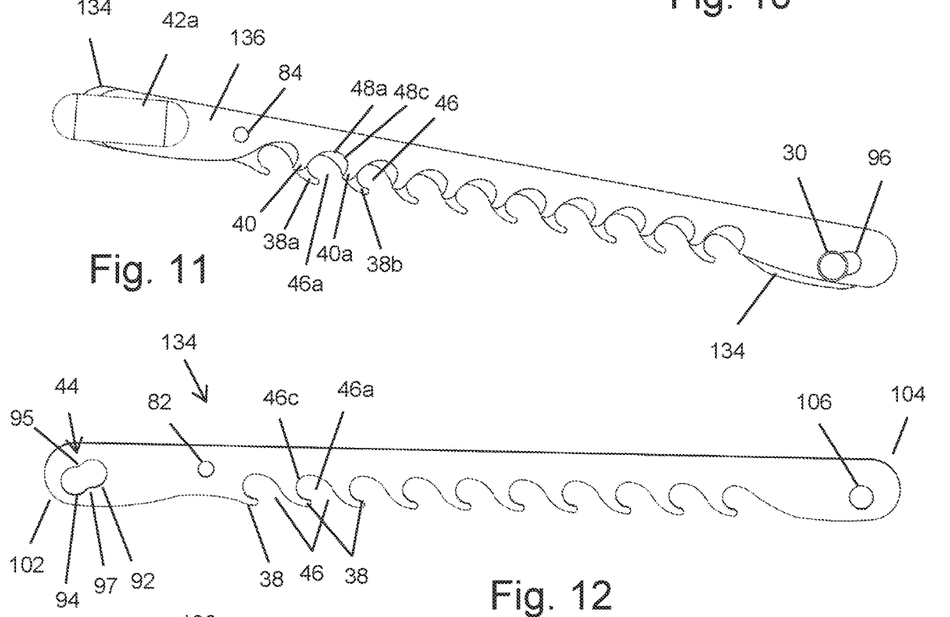
FIG. 11 is a first side view of the arms of FIG. 10 in a raised and released position.
FIG. 12 is a first side view of a first arm of the arms of FIG. 10.
Figure 13:
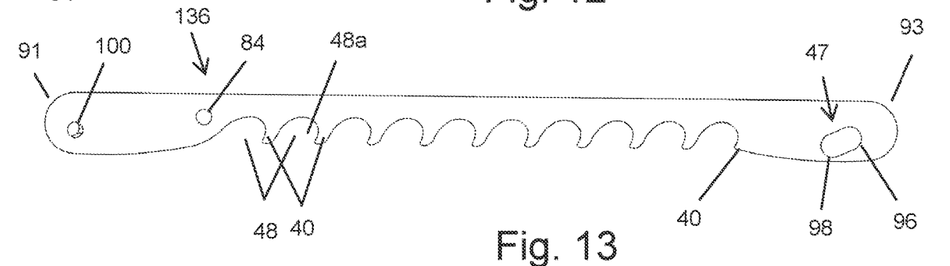
FIG. 13 is a first side view of a second arm of the arms of FIG. 10.
Figure 14:
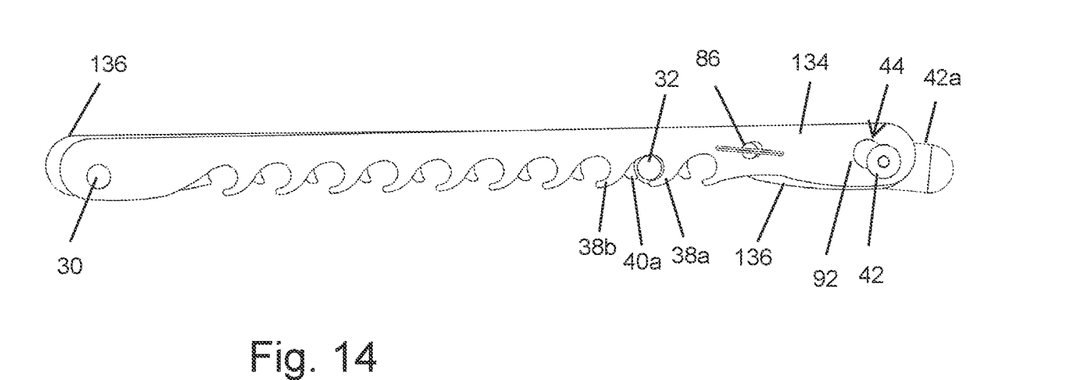
FIG. 14 is an opposite second side view of the arms of FIG. 10 in a secured position.
Figure 15:
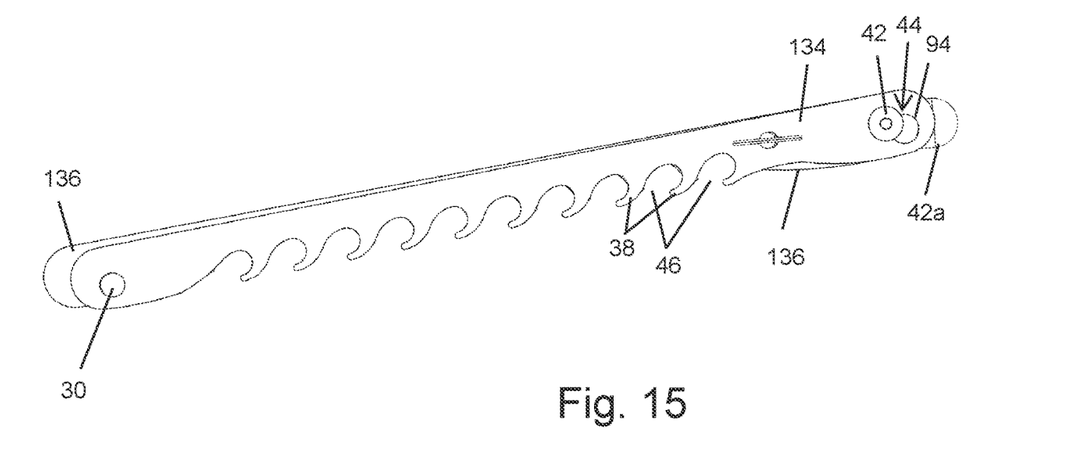
FIG. 15 is an opposite second side view of the arms of FIG. 11 in a raised and released position.

Moving the arm 36 from the secured position to the released position will increase the size of the gap 80 between opposing pairs of teeth 38, 40, such as opposing pair of teeth 38a, 40a, of the respective arms 134, 136. Increasing the size of the gap 80 will allow the arms to be disengaged from the joint 32a and the arms to be removed from the pin 32 via the enlarged gap. As shown in FIG. 11, moving arm 136 in the direction N raises and shifts longitudinally arm 136 relative to arm 134. As a result, slots 46 are no longer blocked by teeth 40, for example, the slot 46a between teeth 38a, 38b is no longer blocked by tooth 40a of arm 136. Then the arms 134, 136 can be lifted upward, such as with the handle 42, in the direction G of FIG. 9 about the pivot location at pin 30. The pin 32 will withdraw from the slot 46 as the arms 134, 136 move upward in the direction G.

When the arms 134, 136 are above and clear of pin 32, the height or elevation of the upper bracket 12, and therefore the mount 120, can be adjusted up in the direction C or down in the direction D. The height or elevation of the upper bracket 12, and therefore the mount 120 can be extended up in the direction C by lifting the upper bracket 12 up in the direction C, which will draw the first joint 30a inward in the direction A and the second joint 32a inward in the direction B. In addition or in the alternative, the mount 120 can be adjusted up in the direction C by pushing the first and second joints 30a, 32a toward each other. Therefore, when the upper bracket 12 is moved up, the first and second joints 30a, 32a will move toward each other. Moving the upper bracket 12 up in the direction C will also cause the pin 32 to move along the arms 134, 136 in the direction B closer to end 93, 104 of the arms 134, 136.

The mount 120 can be retracted down in the direction D by lowering the upper bracket 12 in the direction D, which will move the first joint 30a outward in direction B and the second joint 32a outward in direction A. In addition or in the alternative, the mount 120 can be adjusted down in the direction D by pushing the first and second joints 30a, 32a away from each other. Therefore, when the upper bracket 12 is moved down, the first and second joints 30a, 32a will move away from each other. Moving the upper bracket 12 down in the direction D will also cause the pin 32 to move along the arms 134, 136 in the direction A closer to end 91, 102 of the arms 134, 136.

Figure 10:
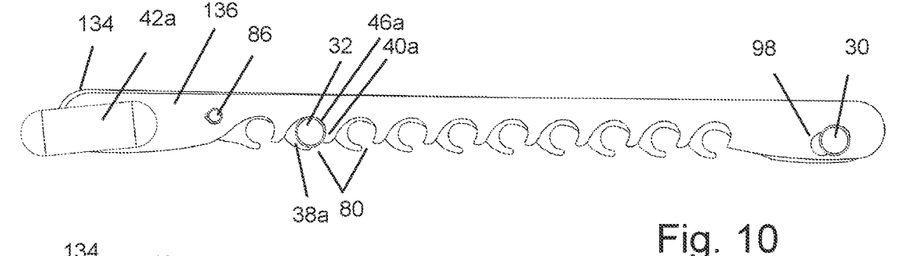
FIG. 10 is a first side view of the arms of the mount of FIG. 9 in a secured position

When the desired height or elevation of the upper bracket 12 is reached, the arms 134, 136 are lowered in the direction H about pin 30 until the pin 32 is received in one of the slots 46, 48 of each arm 134, 136 that corresponds to the desired height or elevation of the upper bracket 12 and mount 120. The handle 42 may be used to lower arms 134, 136 in the direction H about pin 30. When the pin 32 reaches the base 46c of the slot 46, such as shown in FIG. 10 and labeled in FIG. 12, the arm 136 can be moved in the direction O, to move the pin 42 from the released portion 92 to the secured portion 94 and to move channel 47 so that pin 30 is in the secured portion 96, and the pin 32 is held at or adjacent the base 46c of the slot 46 of arm 134. Moving arm 136 in the direction O lowers and shifts longitudinally arm 136 relative to arm 134.

Arm 136 may be moved in direction O by pressing end 93 of arm 136 in direction O and or by moving the handle 42a in the direction O. When the pin 32 is in the base 46c of the slot 46, the tooth 40a will be in contact with or be in close proximity to the side of the pin 32 opposite of tooth 38a. The gap 80 will be reduced to prevent the pin 32 from escaping between opposite teeth 38a, 40a, such as shown in FIG. 10. Then the locking pin 86 can be placed through aligned apertures 82, 84 to hold the arms 134, 136 in the secured position relative to each other.

Therefore, the legs 16, 18, 20, 22 are movable in a scissoring fashion about pins 32, 30 to raise or lower the upper bracket 12 and therefore the height of the mount 120. A user can adjust up or down the elevation of the upper bracket 12 and therefore the height of the mount 120, to the desired height or elevation and then selectively engage the corresponding one of the slots 46, 48 in the arms 134, 136 to the pin 32 to set and secure the upper bracket and mount 120 in the desired elevation or height. Also, the teeth 38, 40 are selectively engageable to the pin to set the desired height or elevation of the upper bracket 12 and therefore the mount 120. Engaging the pin 32 to a slot 46, 48 that is closer to joint 30a and to ends 93, 104 of the arms 134, 136 will cause the upper bracket 12 to be at a higher elevation and the mount 120 to be taller and the joints 32a 30a will be closer together. Conversely, engaging the pin to a slot 46, 48 that is farther from joint 30a and closer to ends 91, 102 of the arms 134, 136 will cause the upper bracket to be at a lower elevation and the mount 120 to be shorter and the joints 32a, 30a will be farther apart. Therefore, the upper bracket 12 and the mount 120 have a plurality of different height positions or elevations above the base bracket 14. The slots 46, 48 correspond to the plurality of different height positions or elevations of the upper bracket 12 above the base bracket 14, and therefore a plurality of heights of the mount 120.

Figure 16:
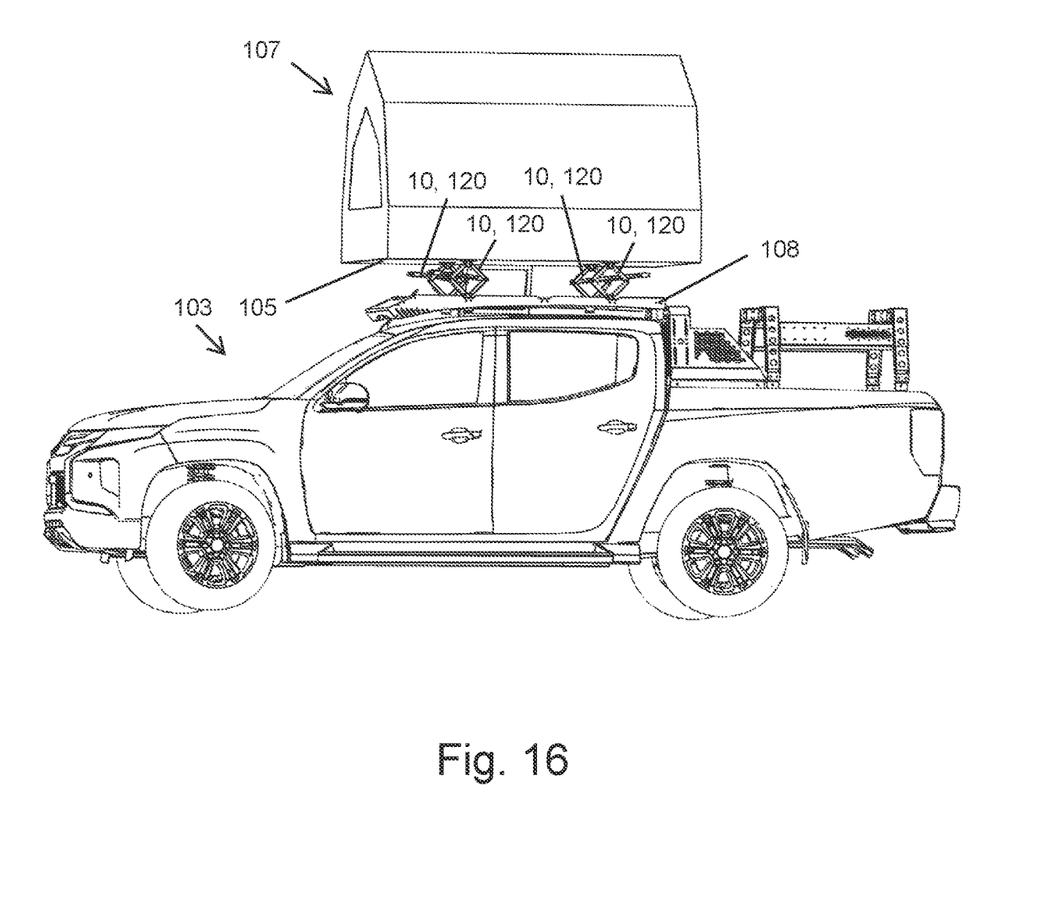
FIG. 16 is a side perspective view of a plurality of leveling mounts of FIG. 1 and/or FIG. 9 deployed at the top of a vehicle supporting a platform supporting a tent.

As shown in FIG. 16, a plurality of leveling mounts 10, 120, such as four, can be used at various locations about a platform 105 to adjust the level of the platform 105 relative to the top of the vehicle 103 where it is deployed. The platform 105 may support a tent 107 or may be integrally formed therewith. The tent may be a roof top tent. The platform may be a rigid structure such as wood or metal and preferably capable of supporting the weight of at least one person. The upper bracket 12 of each mount 10, 120 is fixed to the platform, such as by fasteners (not shown), such as screws or bolts, extending through apertures 76 of upper bracket 12. The base bracket 14 of each mount 10, 120 is fixed to the top of the vehicle 103, such as to a rack 108 that is mounted to the vehicle. Fasteners (not shown), such as screws or bolts, and/or nuts, extend through apertures 76 of base bracket 14 to fix the base bracket 14 of each mount 10, 120 to the rack 108.

The height of each mount 10, 120 and therefore the elevation of each upper bracket 12 of each mount can be independently adjusted and set and secured using the arms 34, 36, 134, 136 as described above. Therefore, if the vehicle and the vehicle top is not level, the leveling mounts 10, 120 can be used to adjust and level the platform 105 independent of the vehicle or vehicle top. Therefore, each of the mounts 10, 120 have a height that is higher, lower, or at the same as the other mounts depending on the level of the vehicle and the desired level of the platform 105. For example, it may be desirable to set the height of each leveling mount 10, 120 so that the platform 105 is horizontal, even if the top the vehicle 103 or rack 108 is not. While the vehicle 103 is shown as a in FIG. 9, the mounts 10, 120 can be used on other vehicles, such as a car, SUV, or van, with or without a rack 108.

A method of leveling a tent above a vehicle is disclosed. A height of the leveling mount for supporting the tent above the vehicle is extended or retracted or otherwise placed according to the user's desired height. The first arm 34, 134 and the second arm 36, 136 of the leveling mount are lowered onto a pin 32 in joint 32a where the pin 32 is received into a slot 46 of the first plurality of slots 46 of arm 34, 134 corresponding to a desired height of the leveling mount 10, 120. The arm 36, 136 is moved relative to the arm 34, 134 to a secured position where a tooth 40a of the plurality of teeth 40 of the second arm 36, 136 blocks the pin 32 from withdraw from the slot in at least one direction. This method can be repeated for each of the leveling mounts 10, 120 deployed about the vehicle to support the tent and to achieve the desire leveling of the tent above the vehicle.

From the foregoing, it will be observed that numerous variations and modifications may be affected without departing from the spirit and scope of the invention. It is to be understood that no limitation with respect to the specific apparatus illustrated herein is intended or should be inferred. For example, one or more component embodiments may be combined, modified, removed, or supplemented to form further embodiments within the scope of the invention. Further, steps could be added or removed from the processes described. Therefore, other embodiments and implementations are within the scope of the invention.

The invention claimed is:

1. A leveling mount for a vehicle mounted tent, comprising:
    a base bracket;
    an upper bracket;
    a first upper leg and a second upper leg pivotally connected to the upper bracket;
    a first lower leg and a second lower leg pivotally connected to the base bracket;
    the first upper leg pivotally connected to the first lower leg at a first joint, the second upper leg pivotally connected to the second lower leg at a second joint;
    a first arm comprising a plurality of slots corresponding to a plurality of elevations of the upper bracket, the first arm connected to the first joint, the first arm releasably connected to the second joint at a selected slot of the plurality of slots;
    a second arm connected to the first joint and releasably connected to the second joint; and,
    the second arm moveable relative to the first arm between a secured position where the first arm and the second arm are secured to the second joint and a released position where the first arm and the second arm are able to disengage from the second joint.

2. The mount of claim 1, wherein
    the first upper leg is pivotally connected to the upper bracket at a first pin;
    the second upper leg is pivotally connected to the upper bracket at a second pin;
    the first lower leg is pivotally connected to the base bracket at a third pin;
    the second lower leg is pivotally connected to the base bracket at a fourth pin;
    the first arm and the second arm are connected to the first upper leg and the first lower leg at a fifth pin in the first joint; and,
    the first arm and the second arm are releasably connected to the second upper leg and the second lower leg at a sixth pin in the second joint.

3. The mount of claim 1, wherein the first arm is releasably connected to the second joint at a pin in the second joint.

4. The mount of claim 3, wherein the plurality of slots are configured to receive the pin.

5. The mount of claim 4, wherein the plurality of slots are a first plurality of slots, and the second arm comprises a second plurality of slots for receiving the pin, where the second plurality of slots overlap the first plurality of slots when the second arm is in the secured position.

6. The mount of claim 4, wherein the second arm comprises a plurality of teeth, the plurality of slots are interspersed between the plurality of teeth.

7. The mount of claim 4, wherein the second arm comprises a plurality of teeth configured for selectively engaging the pin.

8. The mount of claim 6, wherein the plurality of teeth are a second plurality of teeth, and the first arm comprises a first plurality of teeth configured for selectively engaging the pin.

9. The mount of claim 8, wherein the first plurality of teeth converge with the second plurality of teeth.

10. The mount of claim 1, wherein
    the second arm comprises a first channel at a first end and a second channel at a second end;
    the first channel comprises a first portion and a second portion, the first portion configured to receive a first pin when the second arm is in the secured position and the second portion is configured to receive the first pin when the second arm is in the released position;
    the second channel comprises a third portion and a fourth portion, the third portion configured to receive a second pin when the second arm is in the secured position, the fourth portion configured to receive the second pin when the second arm is in the released position; and,
    the first pin and the second pin are connected to the first arm.

11. The mount of claim 1, wherein the first arm and the second arm are releasably connected to the second upper leg and the second lower leg at a pin in the second joint when the second arm is in the secured position.

12. The mount of claim 1, wherein,
    the first arm comprises a first channel at a first end;
    the second arm comprises a second channel at a second end;
    the first channel comprises a first portion and a second portion, the first portion configured to receive a first pin when the second arm is in the secured position and the second portion is configured to receive the first pin when the second arm is in the released position;
    the second channel comprises a third portion and a fourth portion, the third portion configured to receive a second pin when the second arm is in the secured position, the fourth portion configured to receive the second pin when the second arm is in the released position;
    the first pin is fixed to the second arm; and,
    the second pin is fixed to the first arm.

13. The mount of claim 12, comprising a locking mechanism comprising a third pin, a first aperture in the first arm and a second aperture in the second arm, the first aperture and the second aperture are aligned when the second arm is in the secured position for receiving the third pin to lock the second arm in the secured position relative to the first arm.

14. The mount of claim 1, wherein the first upper leg, the second upper leg, the first lower leg, and the second lower leg each comprise a first segment and a second segment, the first segment is parallel to the second segment.

15. The mount of claim 14, wherein the first upper leg, the second upper leg, the first lower leg, and the second lower leg each comprise a third segment connecting the first segment and the second segment.

16. The mount of claim 1, wherein a first end of each of the first lower leg and the second lower leg comprises a gear, and the gear of the first lower leg is meshed with the gear of the second lower leg.

17. The mount of claim 1, where in the upper bracket comprises a first aperture and a second aperture, the first upper leg is pivotally connected to the upper bracket with a first pin extending through the first aperture and moveable vertically within the first aperture; the second upper leg is pivotally connected to the upper bracket with a second pin extending through the second aperture and moveable vertically within the second aperture.

18. A leveling mount for a vehicle mounted tent, comprising:
a base bracket;
an upper bracket;
a first upper leg and a second upper leg pivotally connected to the upper bracket;
a first lower leg and a second lower leg pivotally connected to the base bracket;
the first upper leg pivotally connected to the first lower leg at a first joint, the second upper leg pivotally connected to the second lower leg at a second joint;
a first arm comprising a plurality of slots corresponding to a plurality of elevations of the upper bracket, the first arm connected to the first joint, the first arm releasably connectable to the second joint at the plurality of slots;
a second arm comprising a plurality of teeth, the second arm connected to the first joint and releasably connected to the second joint; and,
the second arm moveable relative to the first arm between a secured position where the plurality of teeth intersect the plurality of slots and a released position where the plurality of teeth are withdrawn from the plurality of slots.

19. The mount of claim 18, wherein the second joint comprises a pin that is configured to be received at a selected slot of the plurality of slots corresponding to a desired elevation of the plurality of elevations of the upper bracket.

20. A method of leveling a tent above a vehicle, comprising:
extending or retracting a height of a leveling mount for supporting the tent above the vehicle;
lowering a first arm and a second arm of the leveling mount onto a pin in a leg joint where the pin is received into a slot of a first plurality of slots of the first arm corresponding to a desired height of the leveling mount; and,
moving the second arm relative to the first arm to a secured position where a tooth of the second arm blocks the pin from withdraw from the slot in at least one direction.

\* \* \* \* \*